United States Patent
Murata et al.

(10) Patent No.: US 7,757,096 B2
(45) Date of Patent: Jul. 13, 2010

(54) MOBILE UNIT WITH FINGERPRINT SENSOR AND ATTACHMENT STRUCTURE

(75) Inventors: Wataru Murata, Kawasaki (JP);
Hidekatsu Kobayashi, Kawasaki (JP);
Masamichi Watanabe, Kawasaki (JP);
Hiroaki Matsuda, Kawasaki (JP);
Yoshifumi Kajiwara, Kawasaki (JP);
Tatsuhito Araki, Kawasaki (JP);
Yoshiaki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1173 days.

(21) Appl. No.: 11/320,700

(22) Filed: Dec. 30, 2005

(65) Prior Publication Data

US 2007/0067640 A1    Mar. 22, 2007

(30) Foreign Application Priority Data

Sep. 16, 2005 (JP) .............................. 2005-270767

(51) Int. Cl.
*H04K 1/00* (2006.01)
(52) U.S. Cl. ..................... 713/186; 713/170; 380/270
(58) Field of Classification Search ................ 713/170, 713/186; 380/270
See application file for complete search history.

(56) References Cited

U.S. PATENT DOCUMENTS

| 6,924,496 | B2 | 8/2005 | Manansala |
| 2003/0106935 | A1* | 6/2003 | Burchette, Jr. .............. 235/380 |
| 2003/0115490 | A1* | 6/2003 | Russo et al. ................ 713/202 |
| 2003/0224553 | A1* | 12/2003 | Manansala .................. 438/106 |
| 2004/0104807 | A1* | 6/2004 | Ko ............................ 340/5.83 |
| 2005/0044388 | A1* | 2/2005 | Brant et al. ................. 713/186 |
| 2005/0204149 | A1* | 9/2005 | Watanabe .................... 713/186 |
| 2006/0036873 | A1* | 2/2006 | Ho et al. ..................... 713/186 |
| 2006/0107068 | A1* | 5/2006 | Fiske ......................... 713/186 |
| 2006/0176146 | A1* | 8/2006 | Krishan et al. ............ 340/5.53 |
| 2007/0038867 | A1* | 2/2007 | Verbauwhede et al. ...... 713/186 |

FOREIGN PATENT DOCUMENTS

| JP | 2003-044201 | 2/2003 |
| JP | 2004-06889 | 1/2004 |
| JP | 2004-172467 | 6/2004 |
| JP | 2005-204284 | 7/2005 |
| WO | 2004/093008 | 10/2004 |

\* cited by examiner

*Primary Examiner*—Kambiz Zand
*Assistant Examiner*—Tongoc Tran (57) ABSTRACT

A mobile unit with fingerprint sensor, includes a fingerprint sensor; a circuit board on which a plurality of circuit components are mounted, one of the circuit components processes an output signal output from the fingerprint sensor; a key case on which a plurality of key switches, used as operation keys of the mobile unit, are arranged, the key case being fixed to the circuit board; and a sensor-specific board that is provided separately from the circuit board and includes the fingerprint sensor thereon, and that is detachably attached to the key case and the fingerprint sensor is arranged adjacent to the operation keys.

14 Claims, 7 Drawing Sheets

MOBILE UNIT WITH FINGERPRINT SENSOR AND ATTACHMENT STRUCTURE

BACKGROUND OF THE INVENTION

1. Field of the Invention

The present invention relates to a mobile unit such as a mobile phone provided with a fingerprint sensor that can easily be replaced when damaged.

2. Description of the Related Art

In recent years, mobile phones have spread and advanced remarkably. In addition to a simple telephoning function, the mobile phones have various functions, such as an electronic mail function, a personal-information storage, and an electronic payment. In association with such multiple functions, security needs to be ensured to prevent unauthorized use of a mobile phone and unauthorized leakage of information. Measures usually employed to ensure security are a system of previously registering a personal identification number (PIN) and allowing authorized use of a mobile phone only by entering the PIN.

The PIN system has some problems such that an entry operation may be troublesome and the PIN may be leaked. Therefore, recently, mobile phones with fingerprint sensor have been proposed, and such products have actually come into the market. In the mobile phones with fingerprint sensor, a fingerprint of its owner or an authorized user is previously registered in the fingerprint sensor, and use of the mobile phone is allowed if a fingerprint detected on it matches the fingerprint registered.

Figure 6:
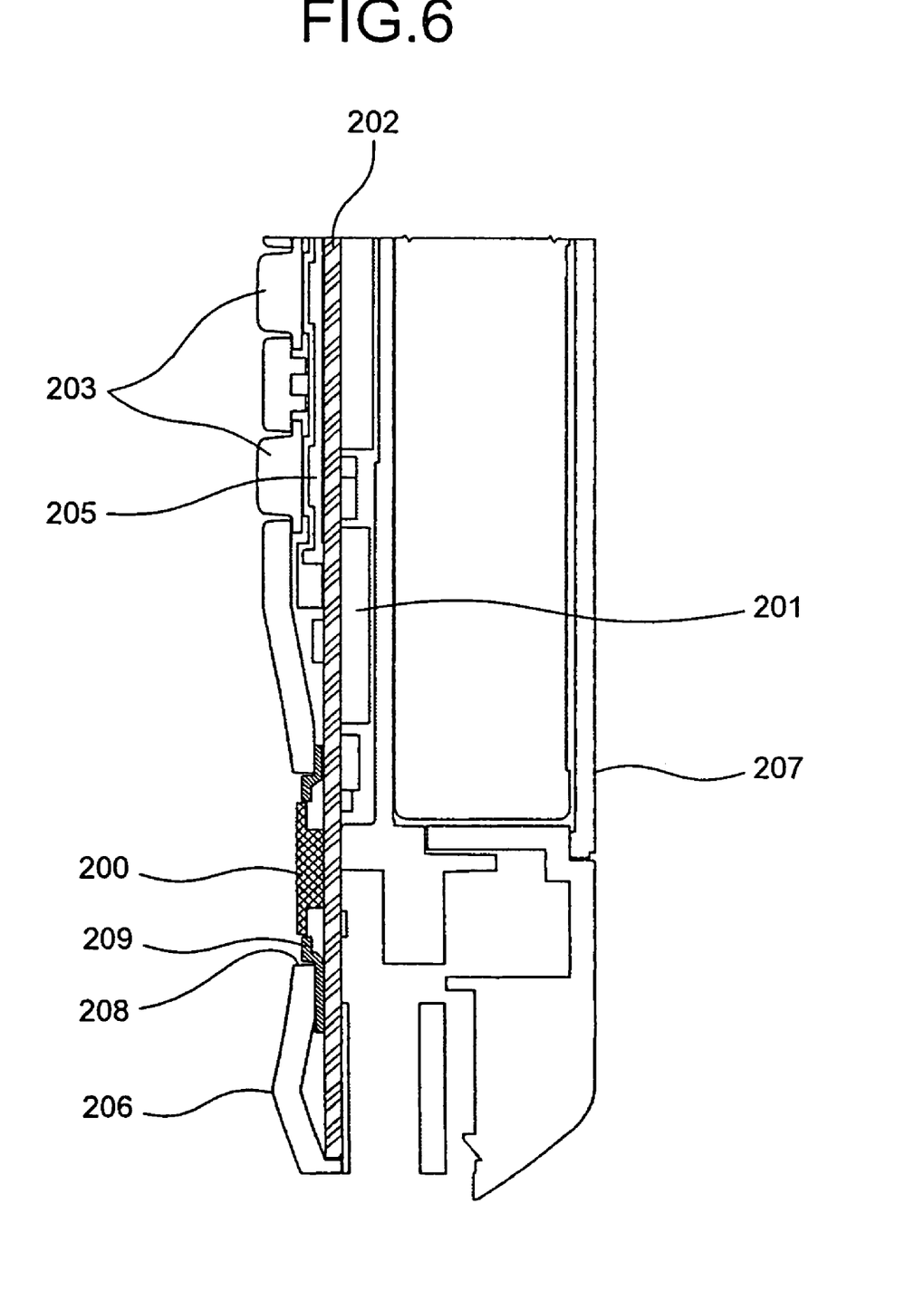
FIG. 6 is a vertical cross-section of an example of a fingerprint sensor attachment portion in a conventional mobile phone.
Figure 7:
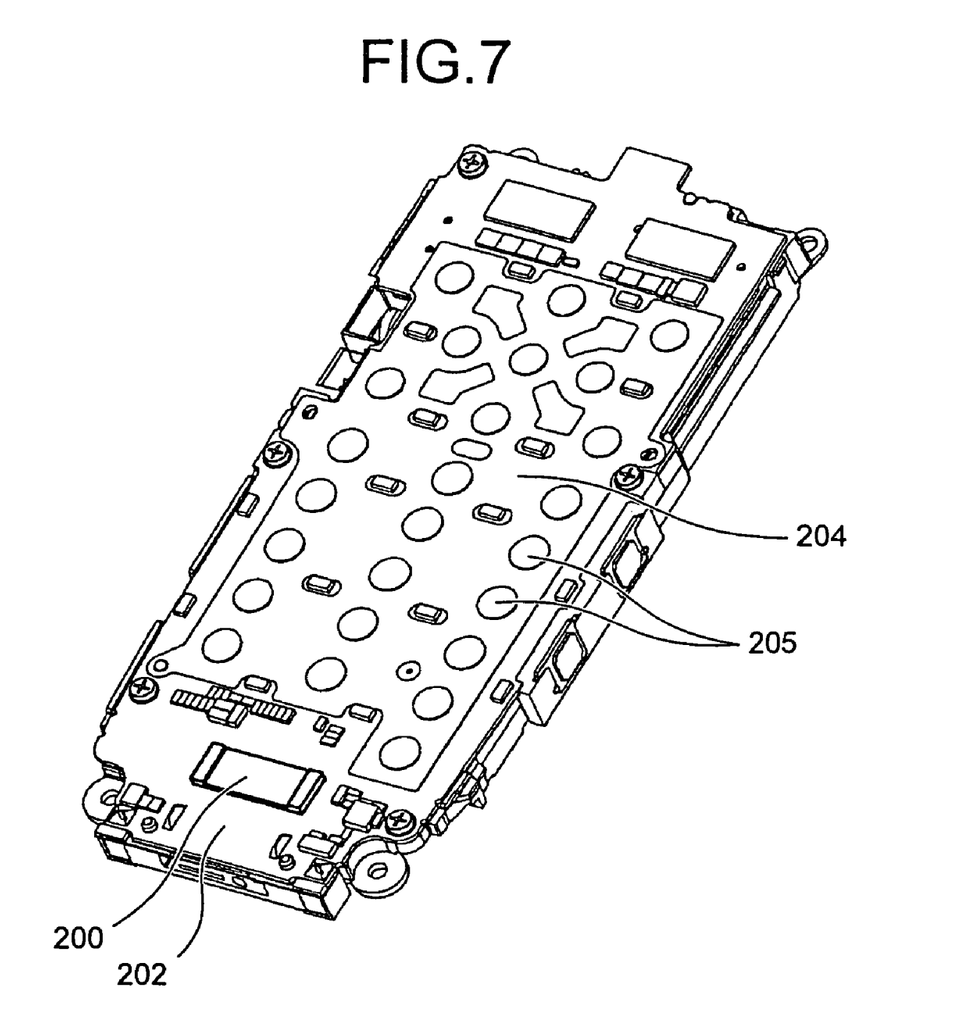
FIG. 7 is a perspective view of an internal configuration of the conventional fingerprint sensor attachment portion.

The structure of how to attach a fingerprint sensor to a conventional mobile phone is explained below with reference to FIG. 6 and FIG. 7. FIG. 6 is a vertical cross-section of a fingerprint sensor attachment portion in a conventional mobile phone. FIG. 7 is a perspective view of an internal configuration of the fingerprint sensor attachment portion. As shown in FIG. 6 and FIG. 7, a fingerprint sensor 200 is mounted on a predetermined location of a circuit board 202 by, for example, soldering. Various types of circuit components 201, including one that processes an output signal of the fingerprint sensor 200, are mounted on the circuit board 202. In these figures, reference numeral 203 represents operation keys such as dial keys, a * key, a # key, and a multifunction key; a plurality of key switches 205 corresponding to the operation keys are aligned on a key sheet 204, which is mounted on the circuit board 202; a key-side case 206 covers the whole of the circuit board 202, but the fingerprint sensor 200 and the operation keys 203 are exposed; and an underside case 207 is paired with the key-side case 206, for covering the whole of the underside. Furthermore, dust-proof rubber packing 209 is provided around an opening 208 of the key-side case 206 for exposing the fingerprint sensor 200.

The fingerprint sensor detects a fingerprint in such a manner that an operator's finger is made to contact the fingerprint sensor and is moved along the fingerprint sensor because of its function. Therefore, the fingerprint sensor is arranged at a location that is visible on an external area of a mobile phone and that can directly be touched with the finger. If the mobile phone needs to be fixed, and if dirt (darkening) and scratches appear on the fingerprint sensor, it is desirable to replace the fingerprint sensor to prevent degradation of the external appearance of the mobile unit and to ensure fingerprint detection capability of the fingerprint sensor.

However, in the conventional mobile phones, the fingerprint sensor 200 is mounted on the circuit board 202 by soldering, as shown in FIG. 6 and FIG. 7. Therefore, it is necessary to take the fingerprint sensor 200 off from the circuit board 202 by force, or to replace the whole of the circuit board 202 if required, and hence, the replacement of the fingerprint sensor 200 is quite troublesome.

Japanese Patent Application Laid-Open No. 2004-172467 and Japanese Patent Application Laid-Open No. 2004-006889 disclose examples of technology in which a fingerprint sensor is mounted on a specific board and the specific board is mounted on a circuit board such as a motherboard. In these examples, only the specific board needs to be replaced to replace the fingerprint sensor. However, because the specific board with the fingerprint sensor mounted thereon is mounted on the circuit board, some other circuit components cannot be mounted on a portion of the circuit board corresponding to the specific board. This restricts a mounting area, thereby affecting reduction of size of the whole device. If the mobile phone is dropped accidentally, the circuit board may be distorted due to drop impact. The fingerprint sensor in the above technology is a pin grid array (PGA), and is mounted simply on the circuit board via the specific board, and damage such as peeling off of solder balls may occur. Furthermore, there are some requirements, from the external design viewpoint, such that the fingerprint sensor be arranged in an outermost position, or in a rearmost position of an opening for exposure. However, in the case of the conventional structure in which the fingerprint sensor is mounted on the circuit board via the specific board, the position of the fingerprint sensor cannot be adjusted in the thickness direction of the mobile phone.

SUMMARY OF THE INVENTION

It is an object of the present invention to at least solve the problems in the conventional technology.

According to one aspect of the present invention, a mobile unit with a fingerprint sensor includes a circuit board on which a plurality of circuit components are mounted, one of the circuit components processing an output signal output from the fingerprint sensor; a key case on which a plurality of key switches, used as operation keys of the mobile unit, are arranged, the key case being fixed to the circuit board; and a sensor-specific board that is provided separately from the circuit board and that is detachably attached to the key case, the fingerprint sensor being mounted on the sensor-specific board adjacent to the operation keys.

According to another aspect of the present invention, an attachment structure for attaching a fingerprint sensor to a mobile unit includes a sensor-specific board on which the fingerprint sensor is mounted; and a circuit board which is provided separately from the sensor-specific board, where circuit components including a circuit component for processing an output signal of the fingerprint sensor are mounted on the circuit board, and the sensor-specific board is detachably attached to a key case on which a plurality of key switches that are used as operation keys of the mobile unit are arranged, the key case being fixed to the circuit board, and the fingerprint sensor being arranged adjacent to the operation keys.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following embodiments, an example of applying the present invention to a mobile phone is explained below.

Figure 1:
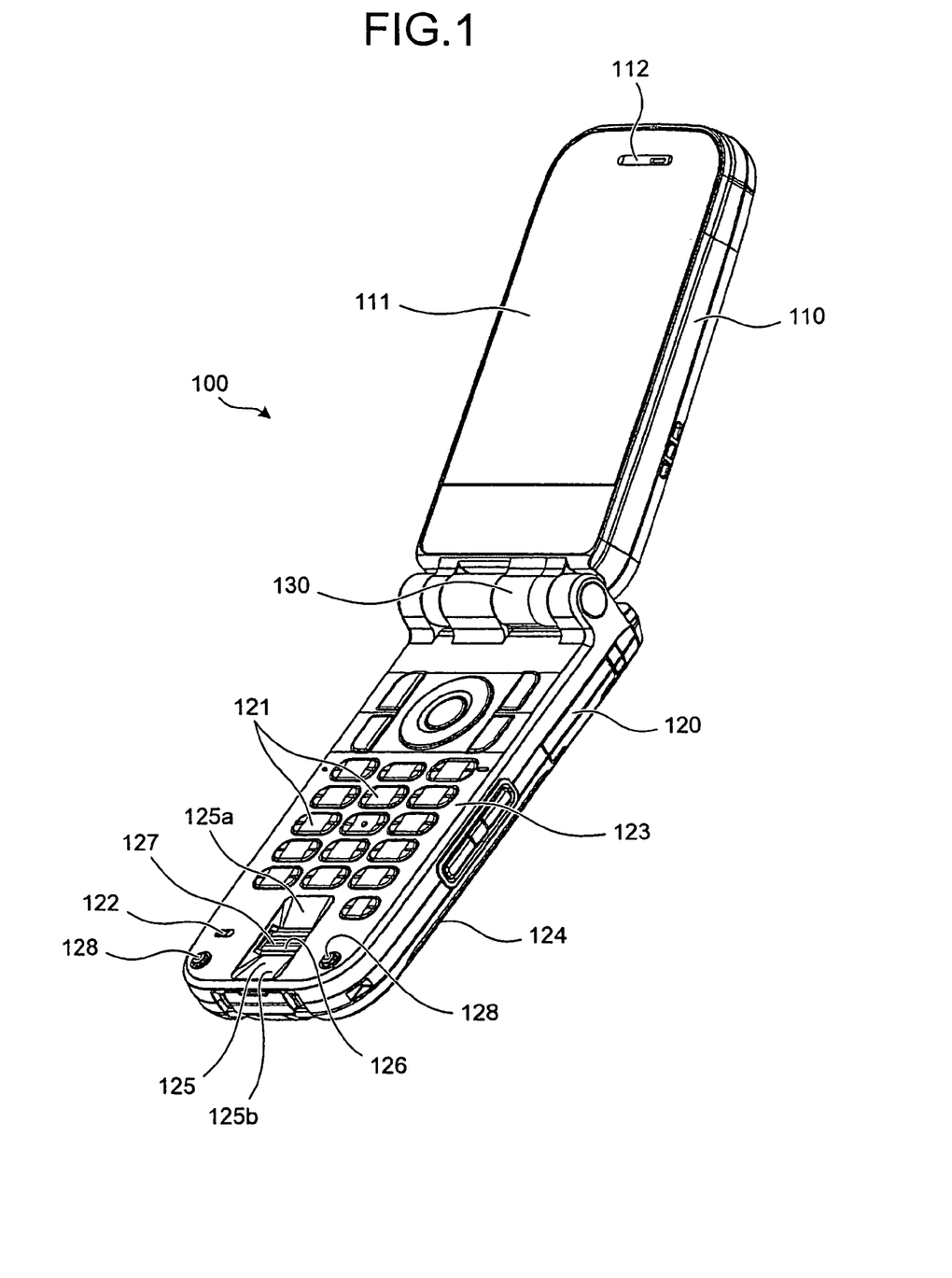
FIG. 1 is an external perspective view of a mobile phone according to an embodiment of the present invention.

FIG. 1 is an external perspective view of a mobile phone according to an embodiment of the present invention. A mobile phone 100 is a folding mobile phone that includes two cases, a top case 110 and a bottom case 120, connected by a hinge 130 and thus the mobile phone 100 can be opened. The top case 110 includes a liquid crystal display unit 111 and a receiver 112, and the bottom case 120 includes a plurality of operation keys 121 such as dial keys, a * key, a # key, and a multifunction key, and a microphone 122. The bottom case 120 includes a key-side case 123 and an underside case 124. The key-side case 123 forms an operation panel surface with the operation keys 121 exposed. The underside case 124 is paired with the key-side case 123 and covers the whole of the underside of the case.

The key-side case 123 of the mobile phone 100 includes a V-shaped groove 125 and a fingerprint sensor 127. The V-shaped groove 125 is formed in a location that is right below the lower keys of the operation keys 121. The fingerprint sensor 127 is exposed to the outside from an opening 126 for exposure, which is formed in the bottom near the center of the V-shaped groove 125. The fingerprint sensor 127 uses a contact-type fingerprint sensor, more specifically, a sweep-type fingerprint sensor that requires an operator to sweep his/her finger from the upper side to the lower side along the fingerprint sensor. Moreover, the fingerprint sensor 127 requires a large number of pins, and, therefore, uses a pin grid array (PGA) structure in which a large number of pins are arranged in a grid shape in the bottom of an integrated circuit (IC) configuration. The V-shaped groove 125 is formed into a shape such that a down slope 125a and an up slope 125b thereof viewed from the side of the operation keys 121 are connected to each other across the opening 126 for exposure, to guide a movement of the finger when the fingerprint sensor 127 detects a fingerprint, and not to erroneously operate the operation keys 121 or the like. The key-side case 123 includes a pair of case pads 128 that are formed by protruding a soft material such as rubber, and are provided on the surface of the lower edge side of the key-side case 123. The case pads 128 serve as a cushion to avoid a direct contact of the top case 110 with the bottom case 120 when the mobile phone 100 is folded.

Figure 2:
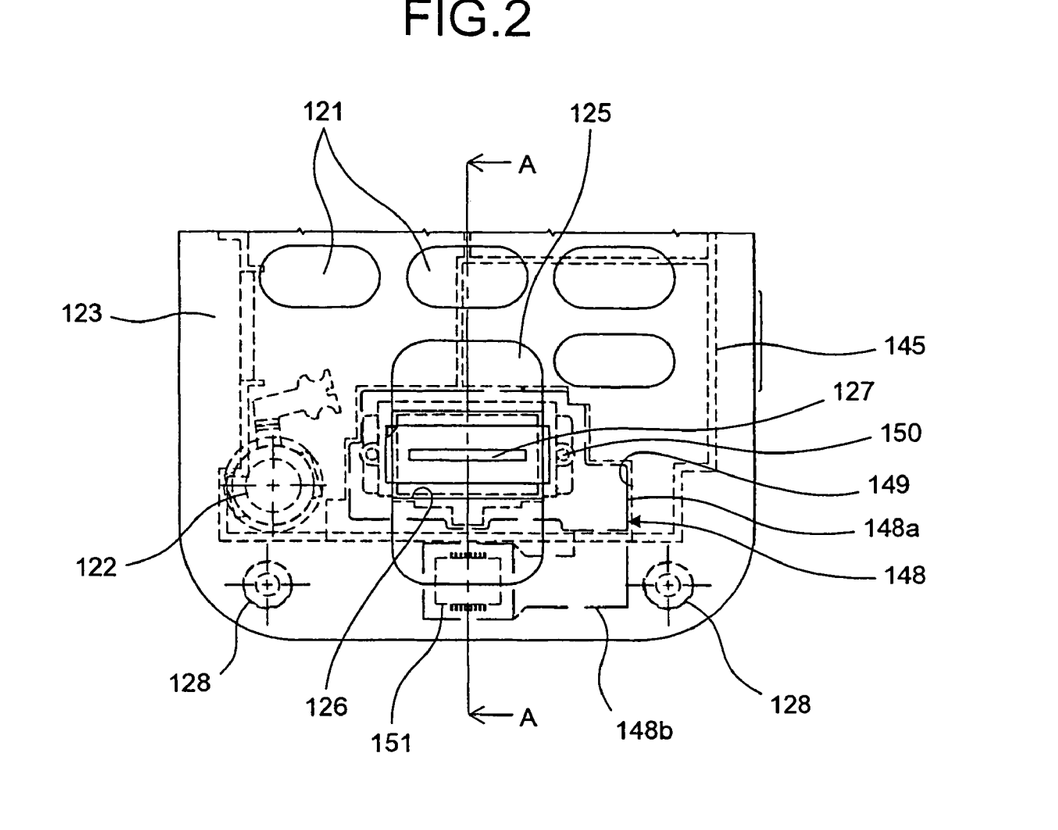
FIG. 2 is a projected front view of an enlarged area around a fingerprint sensor in a bottom case of the mobile phone.
Figure 3:
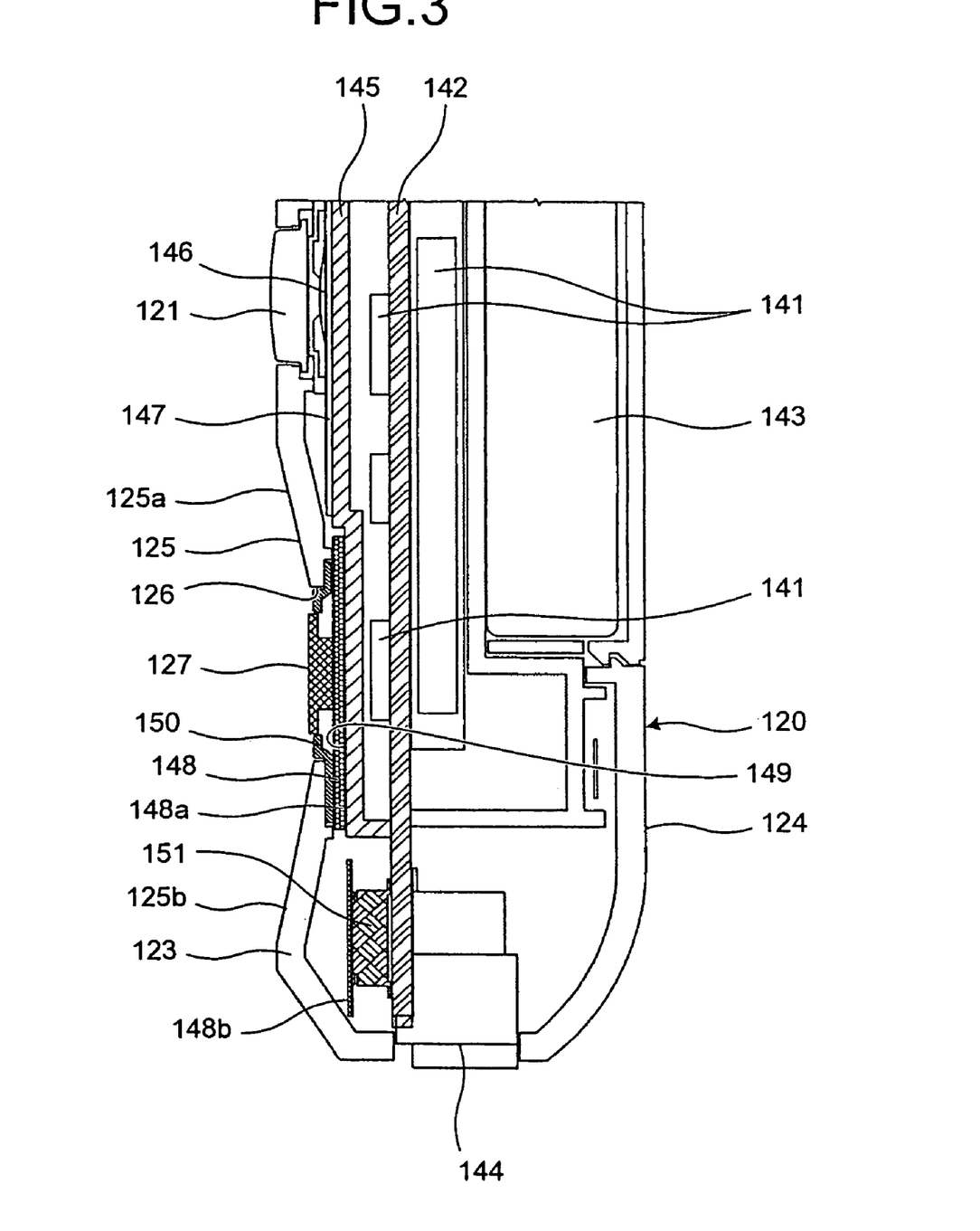
FIG. 3 is a cross-section of an area taken along a line A-A in FIG. 2.
Figure 4:
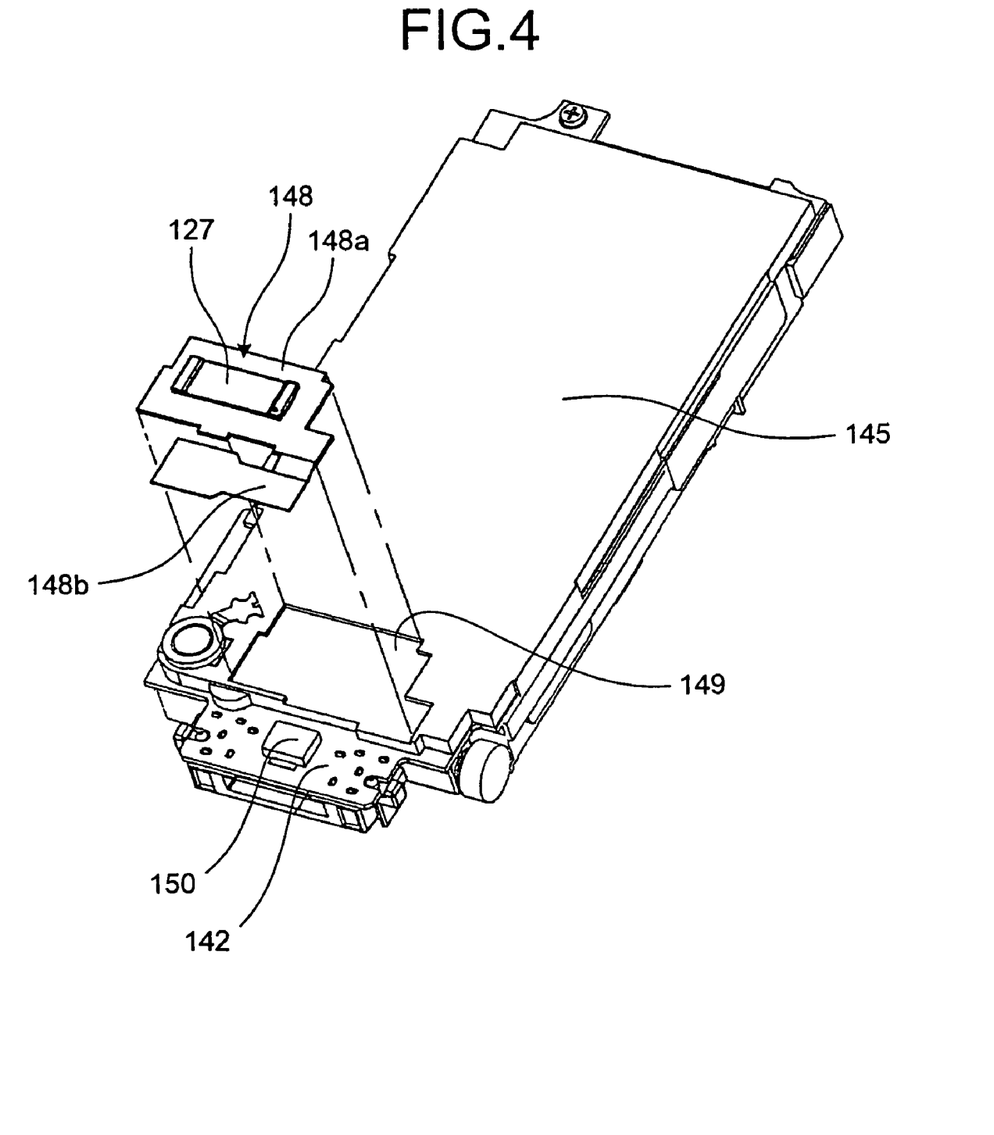
FIG. 4 is a perspective view of an extracted internal structure before attaching the fingerprint sensor.
Figure 5:
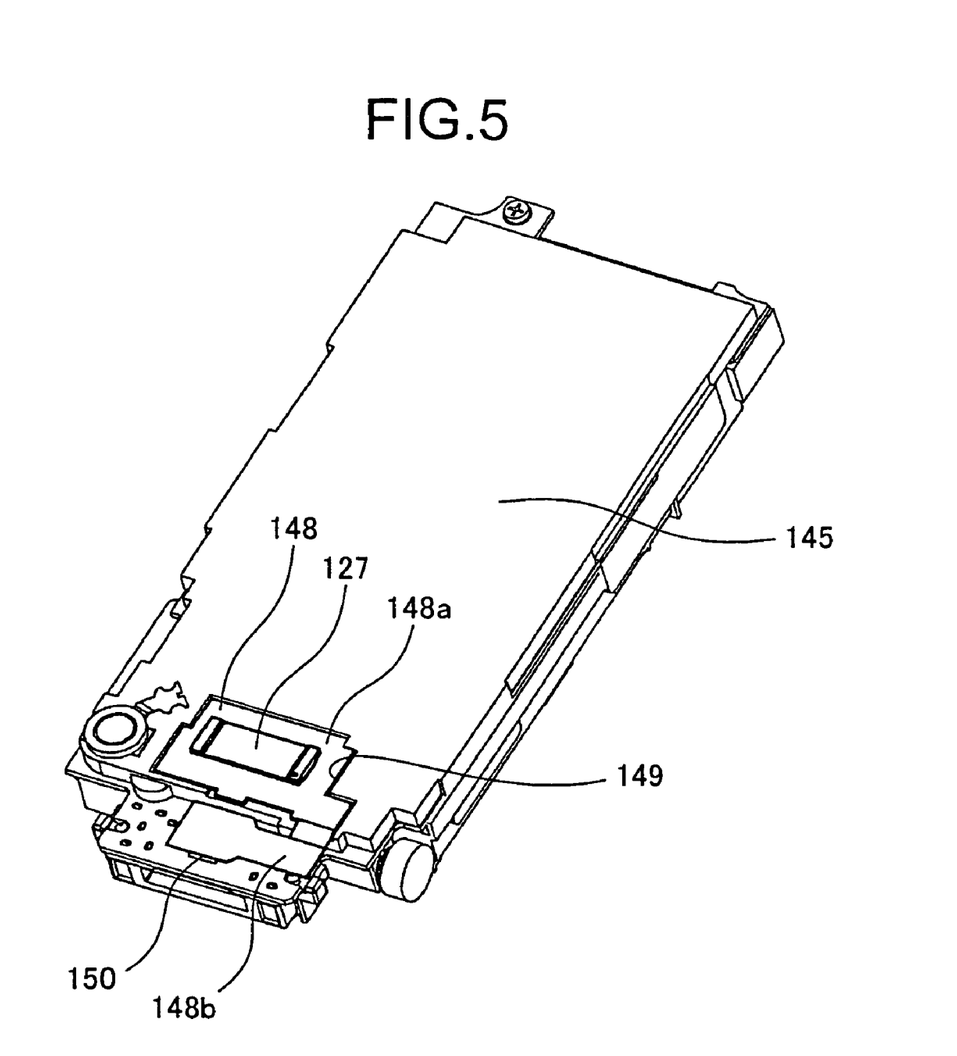
FIG. 5 is a perspective view of an extracted internal structure after attaching the fingerprint sensor.

A method of attaching the fingerprint sensor 127 to the inside of the bottom case 120 of the fingerprint sensor 127 according to the embodiment is explained below. FIG. 2 is a projected front view of an enlarged area around the fingerprint sensor 127 in the bottom case 120, and FIG. 3 is a cross-section of the area taken along a line A-A of FIG. 2. FIG. 4 is a perspective view of an extracted internal structure before attaching the fingerprint sensor, and FIG. 5 is a perspective view of an extracted internal structure after attaching the fingerprint sensor.

The bottom case 120 includes a main board 142, being a circuit board, which is arranged over almost the entire area between the key-side case 123 and the underside case 124, and most of various circuit components 141 to implement required functions as the mobile phone 100 are mounted on its top surface and bottom surface as necessary. The various circuit components 141 mounted on the main board 142 include circuit components that perform processes such as fingerprint recognition and fingerprint verification based on an output signal of the fingerprint sensor 127. A battery 143, and a charging connector 144 are shown in FIG. 3.

In the embodiment, the key-side case 123 includes a firm key case 145 which has a chassis structure formed into a sealed shape so as to cover almost the entire main board 142 excluding a part thereof on its lower edge side, and to which the main board 142 is fixed. The key case 145 includes a key sheet 147 with a plurality of key switches 146 for the operation keys 121 arranged on the surface thereof (see FIG. 2 and FIG. 3).

The mobile phone 100 includes a sensor-specific board 148 that is provided separately from the main board 142 and mounts the fingerprint sensor 127 thereon. The sensor-specific board 148 is small in size on which only the fingerprint sensor 127 is mounted by soldering or the like. Particularly, the sensor-specific board 148 according to the embodiment is thin and formed with a flexible board 148a. The key case 145 includes an attachment portion 149 which is formed into a slightly recessed shape so as to fit along the sensor-specific board 148, and which is used to attach the sensor-specific board 148 to nearly the center of the lower edge portion corresponding to the opening 126 for exposure. The flexible board 148a is attached to and fixed to the attachment portion 149 of the key case 145 with a two-sided tape (not shown). Dust-proof rubber packing 150 for sealing the periphery of the fingerprint sensor 127 is provided in the portion of the opening 126 for exposure of the key-side case 123, so that a space between the key-side case 123 and the flexible board 148a is filled with the dust-proof rubber packing 150.

Furthermore, the main board 142 has a connector 151 in the lower edge portion that is outside the key case 145. The connector 151 electrically connects the fingerprint sensor 127 mounted on the sensor-specific board 148, and required circuit components on the main board 142. The height of the connector 151 is equivalent to the height of the key case 145. A flexible cable 148b is provided integrally with the flexible board 148a in the sensor-specific board 148. The flexible cable 148b electrically connects the flexible board 148a with the fingerprint sensor 127 mounted and the connector 151, and the connector portion of the flexible cable 148b is firmly connected to the connector 151, so that the flexible board 148a can be detachably and electrically connected to the connector 151.

Based on such a configuration, the fingerprint sensor 127 authenticates its owner or its authorized user. Here, the fingerprint sensor 127 is a sweep-type fingerprint sensor. A person to be authenticated moves his/her fingertip along the fingerprint sensor 127 while touching it, to detect his/her fingerprint. Therefore, the fingerprint sensor 127 is disposed in a position of the mobile phone 100 that is visible from the outside, and can be touched with the fingertip. Consequently, dirt like darkening may be deposited on the fingerprint sensor 127 over time, and the fingerprint sensor 127 may have some scratches. In the above cases, when the mobile phone is to be fixed, its manufacturer replaces the fingerprint sensor 127 with a new one to prevent degradation of the external appearance of the mobile unit and to ensure detection capability of the fingerprint sensor 127.

However, according to this embodiment, the fingerprint sensor 127 is not mounted directly on the main board 142 but is mounted on the sensor-specific board 148 that is provided separately from the main board 142, and the sensor-specific board 148 is attached to the attachment portion 149 with the two-sided tape, thereby electrically connecting the sensor-specific board 148 to the main board 142 through the connector 151, to allow detachable arrangement. Therefore, when the fingerprint sensor 127 needs to be replaced, the connector is disconnected and the sensor-specific board 148 is only detached and removed from the attachment portion 149. Moreover, there is no waste as when the whole of the main board 142 is replaced. Thus, the replacement can be performed easily.

Because the flexible board 148a is used as the sensor-specific board 148, a different-board system can be achieved without detriment to the smaller size and the lighter weight of the mobile phone 100.

Furthermore, the sensor-specific board 148 with the fingerprint sensor 127 mounted thereon is attached not to the main board 142 but to the key case 145 to form a two-storied structure. This allows the circuit components 141 to be mounted on the main board 142 in a space that is formed with the underside of the fingerprint sensor 127 as shown in FIG. 3, thus enlarging the mounting area of the main board 142. The mobile phone 100 may sometimes be dropped accidentally, and in this case, the drop impact may be applied to the mobile phone 100, which leads to distortion of the main board 142. In this particular case, if the fingerprint sensor 127, being the PGA component, is directly mounted on the main board 142, the fingerprint sensor 127 may be damaged, such as separation of solder balls. However, in the embodiment, the sensor-specific board 148 is small in size and is fixed to the firm key case 145, and therefore, the fingerprint sensor 127 cannot be easily affected by the distortion, thus being difficult to be damaged.

As shown in FIG. 6, when the fingerprint sensor is directly mounted on the main board, fine foreign substances may quite possibly enter the main board through a joint gap even if the periphery of the fingerprint sensor is sealed with the dust-proof rubber packing. However, in the embodiment, the main board 142 is fixed to the key case 145, and uses a sealed structure in such a manner that the periphery of the fingerprint sensor 127 that is exposed to the outside is sealed with the dust-proof rubber packing 150. Therefore, the foreign substances can hardly reach up to the main board 142 even through the joint gap.

Furthermore, there are some requirements, from the external design viewpoint, such that the fingerprint sensor 127 be arranged in an outermost position, or in a rearmost position of the opening 126 for exposure. However, in the case of the conventional structure in which the fingerprint sensor is directly mounted on the circuit board, the position of the fingerprint sensor cannot be adjusted in the thickness direction of the mobile phone. In this regard, in the embodiment, the height (depth of the recess) of the attachment portion 149 of the key case 145 can be designed as required, thereby adjusting the position of the fingerprint sensor 127 in its thickness direction.

The case where the present invention is applied to the folding mobile phone 100 is explained in the embodiment. However, the mobile phone mentioned here does not indicate a communication system. The present invention may be applied to, for example, a personal handyphone system (PHS). Moreover, from the structural viewpoint, it is not limited to the folding method using the hinge 130, and may be one-piece type that cannot be folded.

The fingerprint sensor 127 is arranged in a location adjacent to the operation keys 121, and the sensor-specific board 148 is mounted on the key case 145 to be electrically connected to the main board 142. However, the location where the fingerprint sensor 127 is arranged may be set as required according to the purpose and design. In some cases, the sensor-specific board may be provided in the top case 110, to be connected to the circuit board for display control provided in the top case 110, through a connector.

Furthermore, the mobile unit with fingerprint sensor is not limited to the mobile phone 100, and may also be applied to any mobile unit such as a personal digital assistant (PDA) and a notebook-size personal computer with the fingerprint sensor mounted thereon.

According to one aspect of the present invention, the fingerprint sensor is easy to replace. Moreover, the fingerprint sensor is mounted on the sensor-specific board which in turn is attached to the key case, thus difficult to be damaged. Furthermore, the position of the fingerprint sensor can be adjusted in the thickness direction.

Moreover, different types of sensor-specific boards can be used in the mobile unit, without hampering the compactness and the light weight of the mobile unit.

Furthermore, detection capability of the fingerprint sensor can be ensured without causing degradation of the external appearance of the mobile unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile unit with a fingerprint sensor, comprising:
   a circuit board on which a plurality of circuit components are mounted, wherein one of the circuit components processes an output signal output from the fingerprint sensor;
   a key case on which a plurality of key switches used as operation keys of the mobile unit are arranged, the key case being fixed to the circuit board;
   a sensor-specific board that is provided separately from the circuit board and that is detachably attached to the key case, the fingerprint sensor being mounted on the sensor-specific board adjacent to the operation keys; and
   a case that exposes both the key switches arranged on the key case and the fingerprint sensor mounted on the sensor-specific board in a same direction.

2. The mobile unit with fingerprint sensor according to claim 1, wherein
   a connector is provided on the circuit board; and
   the sensor-specific board is electrically and detachably connected to the circuit board by the connector.

3. The mobile unit with fingerprint sensor according to claim 2, wherein
   the sensor-specific board includes a flexible board that is integrally provided with a flexible cable for connection to the connector.

4. The mobile unit with fingerprint sensor according to claim 1, wherein
   the fingerprint sensor is a contact-type fingerprint sensor.

5. The mobile unit with fingerprint sensor according to claim 1, wherein
the fingerprint sensor is a sweep-type fingerprint sensor.

6. The mobile unit with fingerprint sensor according to claim 1, wherein
the sensor-specific board is detachably attached to the key case by pasting.

7. The mobile unit with fingerprint sensor according to claim 6, wherein
the sensor-specific board is detachably attached to the key case using a two-sided tape.

8. An attachment structure for attaching a fingerprint sensor to a mobile unit, comprising:
a sensor-specific board on which the fingerprint sensor is mounted;
a circuit board which is provided separately from the sensor-specific board; and
a case that forms an operation panel surface, wherein
circuit components including a circuit component for processing an output signal of the fingerprint sensor are mounted on the circuit board,
the sensor-specific board is detachably attached to a key case on which a plurality of key switches that are used as operation keys of the mobile unit are arranged, the key case being fixed to the circuit board, and the fingerprint sensor being arranged adjacent to the operation keys, and
the case exposes both the key switches arranged on the key case and the fingerprint sensor mounted on the sensor-specific board in a same direction.

9. The attachment structure according to claim 8, wherein
a connector is provided on the circuit board; and
the sensor-specific board is electrically and detachably connected to the circuit board by the connector.

10. The attachment structure according to claim 9, wherein
the sensor-specific board includes a flexible board that is integrally provided with a flexible cable for connection to the connector.

11. The attachment structure according to claim 8, wherein
the fingerprint sensor is a contact-type fingerprint sensor.

12. The attachment structure according to claim 8, wherein
the fingerprint sensor is a sweep-type fingerprint sensor.

13. The attachment structure according to claim 8, wherein
the sensor-specific board is detachably attached to the key case by pasting.

14. The attachment structure according to claim 13, wherein
the sensor-specific board is detachably attached to the key case using a two-sided tape.

* * * * *